(12) United States Patent
Cyr et al.

(10) Patent No.: US 8,495,217 B2
(45) Date of Patent: Jul. 23, 2013

(54) MECHANISM FOR PREVENTING CLIENT PARTITION CRASHES BY REMOVING PROCESSING RESOURCES FROM THE CLIENT LOGICAL PARTITION WHEN AN NPIV SERVER GOES DOWN

(75) Inventors: Michael P. Cyr, Georgetown, TX (US); James A. Pafumi, Leander, TX (US); Veena Ganti, Austin, TX (US); Vasu Vallabhaneni, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 366 days.

(21) Appl. No.: 12/895,133

(22) Filed: Sep. 30, 2010

(65) Prior Publication Data

US 2012/0084071 A1 Apr. 5, 2012

(51) Int. Cl.
*G06F 15/173* (2006.01)
*G06F 15/16* (2006.01)

(52) U.S. Cl.
USPC .......................... 709/226; 709/203; 710/260

(58) Field of Classification Search
USPC ................. 709/202–203, 225–228; 710/260, 710/266
See application file for complete search history.

(56) References Cited

U.S. PATENT DOCUMENTS

| | | | |
|---|---|---|---|
| 7,260,664 B2* | 8/2007 | Arndt et al. | 710/266 |
| 7,379,994 B2* | 5/2008 | Collazo | 709/226 |
| 2005/0198421 A1* | 9/2005 | Nalawadi et al. | 710/260 |
| 2009/0307378 A1 | 12/2009 | Allen | |
| 2009/0307444 A1 | 12/2009 | Cyr | |
| 2012/0221757 A1* | 8/2012 | Craddock et al. | 710/266 |

* cited by examiner

*Primary Examiner* — Bharat N Barot
(74) *Attorney, Agent, or Firm* — Yudell Isidore Ng Russell PLLC

(57) ABSTRACT

With N_Port ID Virtualization (NPIV), a managed system can be configured so that multiple logical partitions (LPARs) can access independent physical storage through the same physical fibre channel adapter. An NPIV client recovery component of a virtualization management component, such as a Power Hypervisor (pHYP), provides the emulation mapping between server and client virtual fibre channel adapters. The pHYP also provides a mechanism that prevents client partition crashes when the NPIV server (e.g., a VIOS logical partition) goes down. When the NPIV server is rebooted or powers down, the pHYP handles the client LPARs to avoid a crash by removing processing resources from the client logical partition. Thereby, the client logical partition is prevented from attempting to access a root volume group in physical storage via the NPIV server. The pHYP allocates processor resources to the client LPAR when the NPIV server is again available for I/O processing.

10 Claims, 6 Drawing Sheets

MECHANISM FOR PREVENTING CLIENT PARTITION CRASHES BY REMOVING PROCESSING RESOURCES FROM THE CLIENT LOGICAL PARTITION WHEN AN NPIV SERVER GOES DOWN

BACKGROUND

1. Technical Field

The present disclosure relates generally to computer system partition stability and more specifically to a method and system for preventing an execution crash of a client logical partition.

2. Description of the Related Art

N_Port identifiers, also known as NPIV, are part of the IEEE Fibre Channel standard. The NPort identifiers allows sharing of physical Fibre Channel (FC) ports by multiple operating systems or initiators by letting each initiator have its own Worldwide Port Names (WWPNs). An initiator may receive access to logical units (LUNs) through a small computer system interface (SCSI) target port in a Storage Area Network (SAN) by using one or more WWPNs owned by the initiator. This capability architecturally allows multiple operating systems partitions to share a physical port on a FC Adapter Multiple operating systems partitions may be supported on a Central/Computing Electronic Complex (CEC), or server, that has firmware, and software capabilities to provide SCSI Input/Output (I/O) services to each operating system by virtualizing physical hardware.

To enable NPIV on a managed system such as a CEC, a Virtual I/O Server (VIOS) logical partition is created that provides virtual resources to client logical partitions. The physical fibre channel adapters (that support NPIV) are assigned to the VIOS logical partition. Then, virtual fibre channel adapters (VFCA) are connected on the client logical partitions to server virtual fibre channel adapters on the VIOS logical partition. A virtual fibre channel adapter is a virtual adapter that provides client logical partitions with a fibre channel connection through the VIOS logical partition to a physical storage device of a Storage Area Network (SAN).

BRIEF SUMMARY

Disclosed are a data processing system and a computer program product for virtualizing hardware resources for a client logical partition by a hypervisor firmware layer, and in particular for controlling dispatch of processing for an operating system of the client logical partition to avoid attempts to access physical storage via a virtual input/output adapter when the emulation mapping provided by a virtual input/output server partition are unavailable.

In one embodiment, a data processing system comprises a processor and hypervisor firmware executing on the processor and which provides the following functions: A client virtual input/output adapter of the client logical partition is paired with a server virtual input/output adaptor of virtual input/output server partition. A virtual process of the operating system of the client logical partition is dispatched to the hardware resources for processing. An event is detected that interrupts processing of the virtual input/output server partition. Dispatch of the virtual process of the operating system of the client logical partition is discontinued to the hardware resources for processing to prevent an attempt to use the client virtual input/output adapter. An end of the event that interrupts processing of the virtual input/output server partition is detected. The virtual process of the operating system of the client logical partition is dispatched to the hardware resources for processing.

In an additional embodiment, a computer program product comprises a computer usable storage medium and program code embedded on the computer usable storage medium the when executed by a processor of a data processing system performs the following functions: A client virtual input/output adapter of the client logical partition is paired with a server virtual input/output adaptor of virtual input/output server partition. A virtual process of the operating system of the client logical partition is dispatched to the hardware resources for processing. An event is detected that interrupts processing of the virtual input/output server partition. Dispatch of the virtual process of the operating system of the client logical partition is discontinued to the hardware resources for processing to prevent an attempt to use the client virtual input/output adapter. An end of the event that interrupts processing of the virtual input/output server partition is detected. The virtual process of the operating system of the client logical partition is dispatched to the hardware resources for processing.

In an exemplary aspect, a hypervisor receives a call from the operating system of the client logical partition to register for the event, and stores a registration to the event associated with an action to discontinue dispatch.

In a further exemplary aspect, the hypervisor utility further provides the function of dispatching a virtual input/output process of the virtual input/output server partition that emulates mapping of the server virtual input/output adapter to a physical channel adapter, wherein the physical channel adapter comprises a physical fibre channel adapter that utilizes N_Port 1D Virtualization (NPIV) to access a physical storage.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
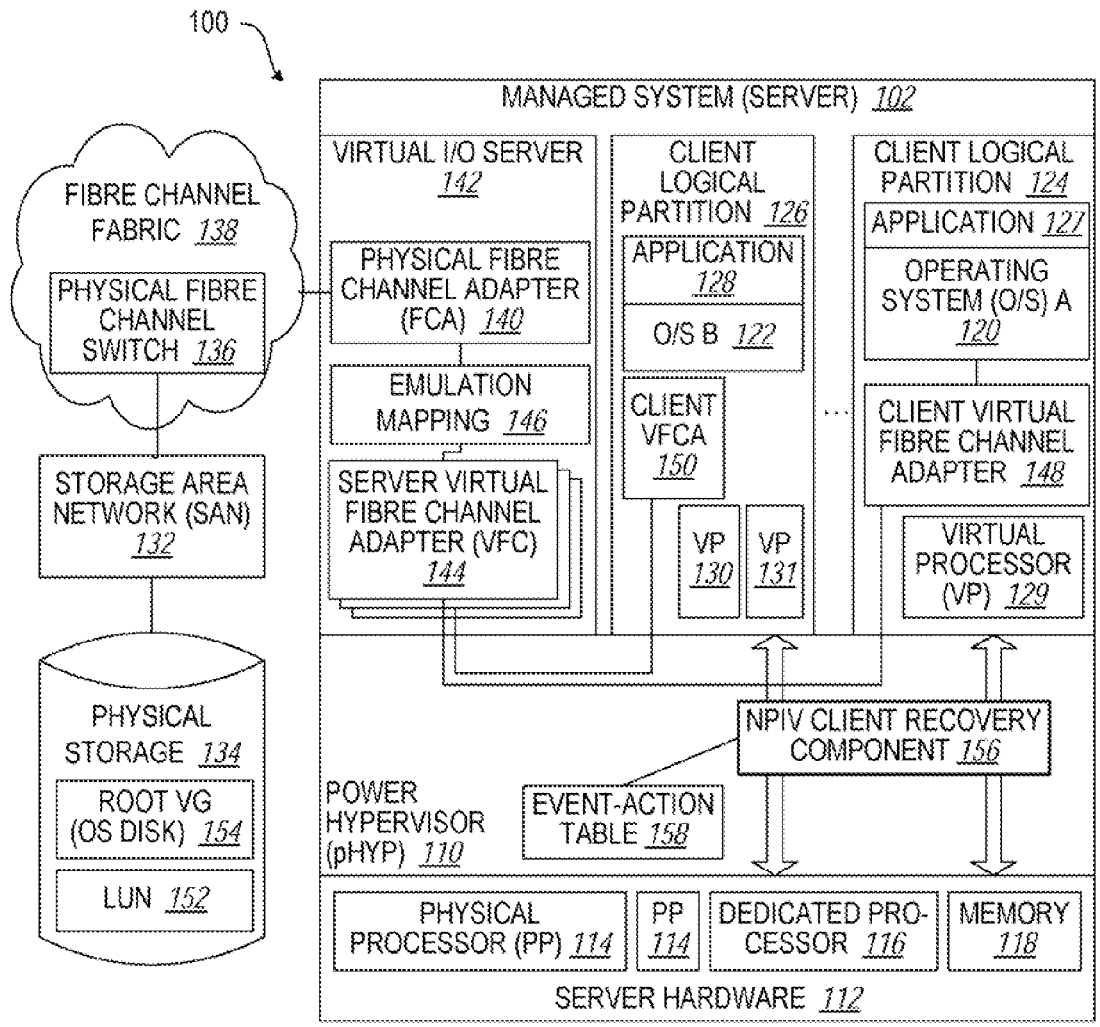
FIG. 1 provides a block diagram representation of an example data processing system that facilitates use of N_Port ID Virtualization (NPIV) by client logical partitions to access physical storage and within which the illustrative embodiments are practiced, according to one embodiment.

The illustrative embodiments provide a method, data processing system and computer program product for a hypervisor firmware layer that virtualizes underlying hardware resources for an operating system of a client logical partition and prevents an I/O related crash of the client logical partition by dynamically suspending allocation of virtual processor resources and/or other virtual resources to the client logical partition following detection of a registered event that would otherwise crash the client logical partition. The suspension of the resources continued during an occurrence of the specific event/condition occurring at the virtual 110 server (VIOS) that provides I/O functionality for the client logical partition.

In one embodiment, the hypervisor firmware layer also controls and configures an input/output (I/O) adapter that accesses a physical storage device via the VIOS partition. When the VIOS partition becomes unavailable, due to an occurrence of one or more events or conditions, the hypervisor firmware layer defers dispatching of processing resources for the client logical partition (LPAR) to thereby "freeze" the context of the operating system, thus preventing any attempt to access the physical storage device via the VIOS partition. In one embodiment, absent this freezing of the OS context to prevent I/O requests being generated by the client LPAR, when the VIOS partition is inactive or unavailable, an I/O attempt by the client LPAR would result in an execution crash of the client LPAR. The hypervisor firmware layer is capable of avoiding this need eventuality, and thus provides a less disruptive path to recovering the client logical partition when the VIOS partition becomes available again.

In one or more embodiments, one or more specific vulnerabilities to an interruption event of the VIOS partition are identified for the client logical partition well in advance of such an occurrence. These vulnerabilities can be registered within the hypervisor layer, in one embodiment. In one embodiment, the operating system performs a call to the hypervisor firmware layer to register specific events. According to one or more embodiments, the hypervisor firmware layer in turn records, within a Look Up Table (LUT), an entry for this registered event along with an associated action to freeze the client logical partition when, if or in response to the occurrence of the registered event. When this particular interruption event occurs, the hypervisor firmware layer performs the associated action.

In an exemplary embodiment, N_Port ID virtualization (NPIV) is used by the VIOS partition for accessing the physical storage devices via a Fibre Channel (FC). NPIV is a technology that allows multiple logical partitions to access independent physical storage through the same physical Fibre Channel adapter. This adapter is attached to a Virtual I/O Server partition which acts only as a pass-through managing the data transfer through a POWER Hypervisor. Each partition using NPIV is identified by a pair of unique worldwide port names (WWPN), enabling each partition to be connected to independent physical storage on a Storage Area Network (SAN). Unlike virtual SCSI, only the client partitions see the disk.

A managed system, such as a Computer Electronic Complex (CEC), is configured to use NPIV, exploiting the adapter capability to define, multiple virtual FCP (Fibre Channel Protocol) channels, each with its own unique fibre channel port name and fibre channel identifier (FC_ID). By assigning distinct virtual port names to different guests, the guests can use the virtual FCP channels as if they were using dedicated physical FCP channels. Access controls based on the virtual port names may be applied in the SAN fabric using standard mechanisms like zoning in the switches and logical unit number (LUN) masking in the storage controllers, thereby providing access control at the FCP subchannel level.

Previously, all FCP subchannels shared the common WWPN burned into the associated FCP adapter. Within the SAN fabric, therefore, the actual I/O initiator (a specific subchannel) could not be determined because the initiator was always the WWPN of the FCP adapter. Access control could only be managed at the adapter level. By contrast, conventional NPIV allows use of multiple Fibre Channel initiators to occupy a single physical port thereby greatly reducing hardware requirements. As an example, International Business Machines (IBM) currently provides NPIV support as part of its System p Advanced POWER Virtualization.

Embodiments introduced and described herein enable the client partitions associated with an NPIV server to remain operational (i.e., not crash) if the NPIV server (i.e., VIOS partition) goes down. For example, all of the associated client partitions having a rootvg on logical units (LUN) from NPIV client adapter will remain "up" (in an operational state) while the NPIV server to which the client partitions are associated temporarily fails, crashes, or is rebooted.

One embodiment is described from the perspective of an operating system (OS) accessing a "rootvg". The rootvg is the volume group (vg) that contains root and other logical volumes created during installation. As one example, the rootvg can be the default Advanced Interactive Executive (AIX) volume group (AIX is a trademark of IBM Corp.). Volume groups (VGs) as used in AIX operating systems are basically logical disks comprised of one or more physical volumes (PVs). Logical Volumes (LV) or "partitions" are created inside volume groups.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

Within the descriptions of the figures, similar elements are provided similar names and reference numerals as those of the previous figure(s). Where a later figure utilizes the element in a different context or with different functionality, the element is provided a different leading numeral representative of the figure number. The specific numerals assigned to the elements are provided solely to aid in the description and not meant to imply any limitations (structural or functional or otherwise) on the described embodiment.

It is understood that the use of specific component, device and/or parameter names (such as those of the executing utility/logic described herein) are for example only and not meant to imply any limitations on the described embodiments. The presented embodiments may thus be implemented with different nomenclature/terminology utilized to describe the components/devices/parameters herein, without limitation. Each term utilized herein is to be given its broadest interpretation given the context in which that terms is utilized.

As further described below, implementation of the functional features of the invention is provided within processing devices/structures and involves use of a combination of hardware, firmware, as well as several software-level constructs (e.g., program code). The presented figures illustrate both hardware components and software components within example data processing With reference now to the figures, and beginning with FIG. 1, there is depicted a block diagram representation of an example data processing system (DPS) 100, as utilized within one embodiment. A managed system, depicted as a server 102, supports one or more client applications and operating systems by virtualization of internal and external hardware resources.

A virtualization management component, such as the power hypervisor (pHYP) 110 (of International Business Machines) of the server 102 is a firmware utility layer sitting above server hardware 112, depicted as shared physical processors 114, dedicated processors 116 and memory 118. The pHYP 110 lies below hosted operating systems 120, 122 in respective client logical partitions (LPARs) 124, 126. Various applications 127, 128 can run atop of the operating systems 120, 122.

The pHYP 110 delivers functions that enable capabilities including dedicated-processor partitions, micro-partitioning, virtual processors, IEEE Virtual Local Area Network (VLAN) compatible virtual switch, virtual Ethernet adapters, virtual Small Computer System Interface (SCSI) adapters, and virtual consoles. Other functions may be supported in alternate embodiments. Also, other types of virtualization management components may be utilized within alternate embodiments.

In particular, the pHYP 110 enforces partition integrity by providing a security layer between logical partitions 124, 126, provides an abstraction layer between the physical hardware resources (server hardware 112) and the logical partitions 120, 122 using them. The pHYP 110 controls the dispatch of virtual processors 129-131 to physical processors 114, 116, and saves and restores all processor state information during virtual processor context switch. The pHYP 110 controls hardware Input/Output (110) interrupts and management facilities for partitions 124, 126. The firmware of the pHYP 110 and the hosted operating systems 124, 126 communicate with each other through power hypervisor calls (hcalls). Through micro-partitioning, the pHYP 110 allows multiple instances of operating systems to concurrently run on capable servers.

A storage area network (SAN) 132 connects units of physical storage 134 via a physical fibre channel switch 136 of a fibre channel fabric 138 to a physical fibre channel adapter (FCA) 140 that is located in a Virtual I/O Server (VIOS) logical partition 142 on the server 102. The physical fibre channel adapter (FCA) 140 is assigned to the VIOS logical partition 112. For clarity, only one VIOS logical partition 142 is depicted; however, the pHYP 110 can support a plurality of VIOS logical partitions 142.

The physical fibre channel adapter (FCA) 140 connects to a plurality of server virtual fibre channel adapters (VFCs) 144 via an emulation mapping component 146 of the VIOS logical partition 142. All of the server virtual fibre channel adapters 144 on the VIOS logical partition 142 connect to the same physical port on the physical fibre channel adapter 140.

Each server virtual fibre channel adapter 144 on the VIOS partition 142 connects to one client virtual fibre channel adapter 148, 150 on a respective client logical partition 124, 126. There is always a one-to-one relationship between client virtual fibre channel adapters 148, 150 on the client logical partitions 124, 126 and the server virtual fibre channel adapters 144 on the VIOS logical partition 142. That is, in one embodiment, each client virtual fibre channel adapter 148, 150 on a client logical partition 124, 126 connects to only one server virtual fibre channel adapter 144 on the VIOS logical partition 142, and each server virtual fibre channel adapter 144 on the VIOS logical partition 142 connects to only one client virtual fibre channel adapter 148, 150 on a client logical partition 124, 126.

In an exemplary embodiment, the data processing system 100 supports the N_Port ID Virtualization (NPIV) to access the physical storage 134 in a SAN 132 that uses fibre channel fabric 138. NPIV is a Fibre Channel industry standard that facilitates multiple N_Port IDs sharing a single physical N_Port. Conventionally, use of NPIV allows multiple Fibre Channel initiators to occupy a single physical port thereby greatly reducing hardware requirements. As an example, International Business Machines (IBM) currently provides NPIV support as part of its System p Advanced POWER Virtualization.

The physical storage 138 is mapped to logical units (LUNs) 152 and the LUNs 152 are mapped to the ports of physical fibre channel adapters 140. Using SAN tools, LUNs 152 can be zoned and masked to include worldwide port names (WWPNs) (MAC ID) that are assigned to client virtual fibre channel adapters 148, 150 on client logical partitions 124, 126. The SAN 132 uses WWPNs that are assigned to client virtual fibre channel adapters 148, 150 on client logical partitions 124, 126 the same way that the SAN 132 uses WWPNs that are assigned to physical ports.

Using their unique WWPNs and virtual fibre channel connections, to the physical fibre channel adapter 140, the operating systems 120, 122 that run in the respective client logical partitions 124, 126 discover, instantiate, and manage their physical storage 134 located on the SAN 132. The VIOS logical partition 142 provides the client logical partitions 124, 126 with a connection to the physical fibre channel adapters 140 on the server 102.

The pHYP 110 performs virtual processor dispatch. Physical processors are abstracted by the pHYP 110 and presented to micro-partitions as virtual processors. Micro-partitions are allocated a number of virtual processors when they are created. The number of virtual processors allocated to a micro-partition can be dynamically changed. The number of virtual processors in a micro-partition and in all micro-partitions does not necessarily have any correlation to the number of physical processors in the physical shared-processor pool. In terms of capacity, a physical processor can support up to ten virtual processors. The pHYP 110 manages the distribution of available physical processor cycles from the processors in the physical shared-processor pool. To optimize physical processor utilization, a virtual processor will yield a physical processor resource if the virtual processor has no work to run on the client LPAR or enters a wait state (such as waiting for a lock or for an I/O to complete). In one embodiment, the virtual processor yields a physical processor through a power hypervisor call.

In an exemplary aspect, three types of virtual I/O adapters are supported by the pHYP 110: SCSI, Ethernet, and system port (virtual console). The Virtual I/O Server supports optical devices, which are presented to client partitions as a virtual SCSI device. Virtual I/O adapters are defined by system administrators during logical partition definition. Configuration information for the virtual adapters is presented to the partition operating system. The Virtual I/O Server (VIOS)

allows the sharing of physical resources between partitions to allow more efficient utilization. One possible use of the VIOS is for server consolidation. The Virtual 1/0 Server allows virtualization of physical storage resources. Virtualized storage devices are accessed by the client partitions through virtual SCSI devices. All virtual SCSI devices are accessed as standard SCSI compliant logical units (LUs or LUNs) by the client LPAR.

Note that shared I/O devices are owned by a Virtual I/O Server, which provides access to the real hardware upon which the virtual 110 device is based. To support virtual I/O, the pHYP 110 provides support for: control and configuration structures for virtual adapters; controlled and secure transport to physical I/O adapters; and interrupt virtualization and management I/O types.

Embodiments introduced and described herein enable the client partitions associated with an NPIV server to remain operational (i.e., not crash) if the NPIV server goes down. For example, all of the associated client partitions having a rootvg on logical units (LUN) from NPIV client adapter will remain "up" (in an operational state) while the NPIV server to which the client partitions are associated temporarily fails, crashes, or is rebooted.

One embodiment is described from the perspective of an operating system (OS) accessing a "rootvg". The rootvg is the volume group (vg) that contains root and other logical volumes created during installation. As one example, the rootvg can be the default Advanced Interactive Executive (AIX) volume group (AIX is a trademark of IBM Corp.). Volume groups (VGs) as used in AIX operating systems are basically logical disks comprised of one or more physical volumes (PVs). Logical Volumes (LV) or "partitions" are created inside volume groups.

In accordance with one embodiment, the power hypervisor (pHYP) 110 prevents the client logical partition 124 from trying to access a rootvg partition 154 in physical storage 134 when the storage resource is not accessible via a NPIV server (VIOS partition 142). Specifically, in one embodiment, an NPIV client recovery component 156 of the pHYP 110 is provides as a software-implemented component/mechanism that prevents client partition crashes when the NPIV server (VIOS logical partition 142) goes down. To that end, in one or more embodiments, pHYP 110 accepts calls for registration of an event/condition by the client logical partitions 124, 126. The pHYP 110 stores the registration in an event-action Look Up Table (LUT) 158. Upon detecting the event/condition, the pHYP 110 in turn "freezes" the client logical partitions 104 by not dispatching hardware resources 112 to avoid a crash. In one or more embodiments, example events/conditions that can trigger the pHYP 110 to freeze allocation of resources to the client LPARs include, without limitation: detected failure of the VIOS partition, reboot of the VIOS partition, special exceptions registered by the VIOS partition that prevents access by the client LPAR to the I/O adapters of I/O functionality of the VIOS, power off/down of the VIOS partition and/or reboot of the VIOS partition 142.

It is important to note that while embodiments described herein describes the client logical partition registering for specific events, the various embodiments also implemented without such registration. For example, in one or more embodiments, the specific list of events are pre-programmed into the hypervisor functionality such that the hypervisor automatically reacts to the detection of an occurrence of one of multiple pre-identified events/conditions (such as one of the above list of conditions) that affects the operation of the VIOS, and would otherwise potentially cause the client LPAR to crash if advance steps are not taken to shield the client LPAR from the condition occurring at or affecting the VIOS. In one or more alternate embodiments, the OS instance within the VIOS (which creates and supports the VIOS functionality) detects one or more of the conditions and/or events and issues a notification to the hypervisor to cause the hypervisor to suspend resource allocation to the client LPAR. Thus, the registration functionality described herein (as illustrated by the flow charts) presents one embodiment that may be optional depending on the specific implementation in the design of the hypervisor and/or OS for VIOS execution.

Also, it is appreciated that while the resource allocation that is likely to be suspended is the processor resource, other embodiments can provide for suspension of other resources at the client LPAR, where such suspension of the resource does not cause a crash of a client LPAR. Thus, for example, if a client has its processor resources suspended, then the processor is likely also not utilizing all of the allocated memory resources and a re-provisioning of that resource may be implemented in one embodiment until the client LPAR resumes processing and use of the memory resource.

Figure 2:
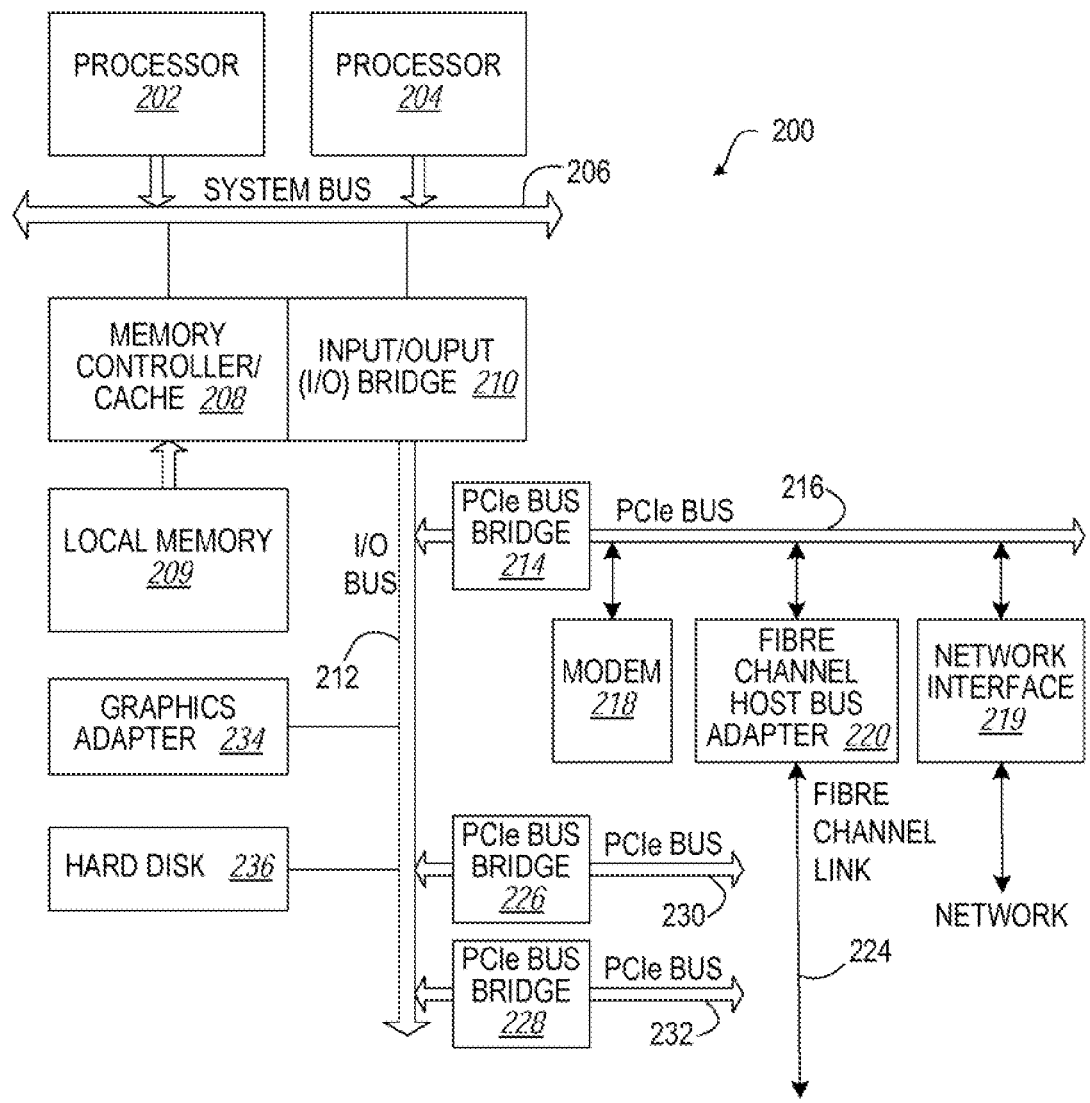
FIG. 2 provides a block diagram of a data processing system in which illustrative embodiments may be implemented.

FIG. 2 is a block diagram of an exemplary data processing system 200 that can be used to implement the virtualized data processing system 100 of FIG. 1 in accordance with the present invention. Data processing system 200 includes one or more processors 202, 204 connected to system bus 206. Alternatively, a single processor system may be employed. Also connected to system bus 206 is memory controller/cache 208, which provides an interface to local memory 209. Input/Output (I/O) bus bridge 210 is connected to system bus 206 and provides an interface to I/O bus 212. Memory controller/cache 208 and 1/0 bus bridge 210 may be integrated as depicted.

Peripheral Component Interconnect Express (PCIe) bus bridge 214 connected to I/O bus 212 provides an interface to PCIe local bus 216. PCIe is illustrative and it should be appreciated with the benefit of the present disclosure that other local bus standards can be employed in the alternative or in addition. A number of I/O adapters, such as modem 218 may be connected to PCI bus 216. Typical PCI bus implementations will support four PCI expansion slots or add-in connectors. Communications links to other computers may be provided through modem 218, network interface device/card 219, and Fibre channel host bus adapter 220. Host Bus Adapter (HBA) 220 enables data processing system 200 to send and receive messages from fibre channel fabric 222 via a Fibre Channel (FC) link 224. The fibre channel fabric can facilitate connections via name server 225 and switches 227.

Additional PCIe bus bridges 226 and 228 provide interfaces for additional PCIe buses 230 and 232 respectively, from which additional modems (not shown) or network adapters 230 may be supported. In this manner, data processing system 200 allows connections to multiple network computers. A memory-mapped graphics adapter 234 and hard disk 236 may also be connected to I/O bus 212 as depicted, either directly or indirectly. In one or more embodiments, these hardware I/O devices are emulated to provide virtualized I/O devices that are mapped to specific client LPARS via one or more VIOS partitions.

Figure 3A:
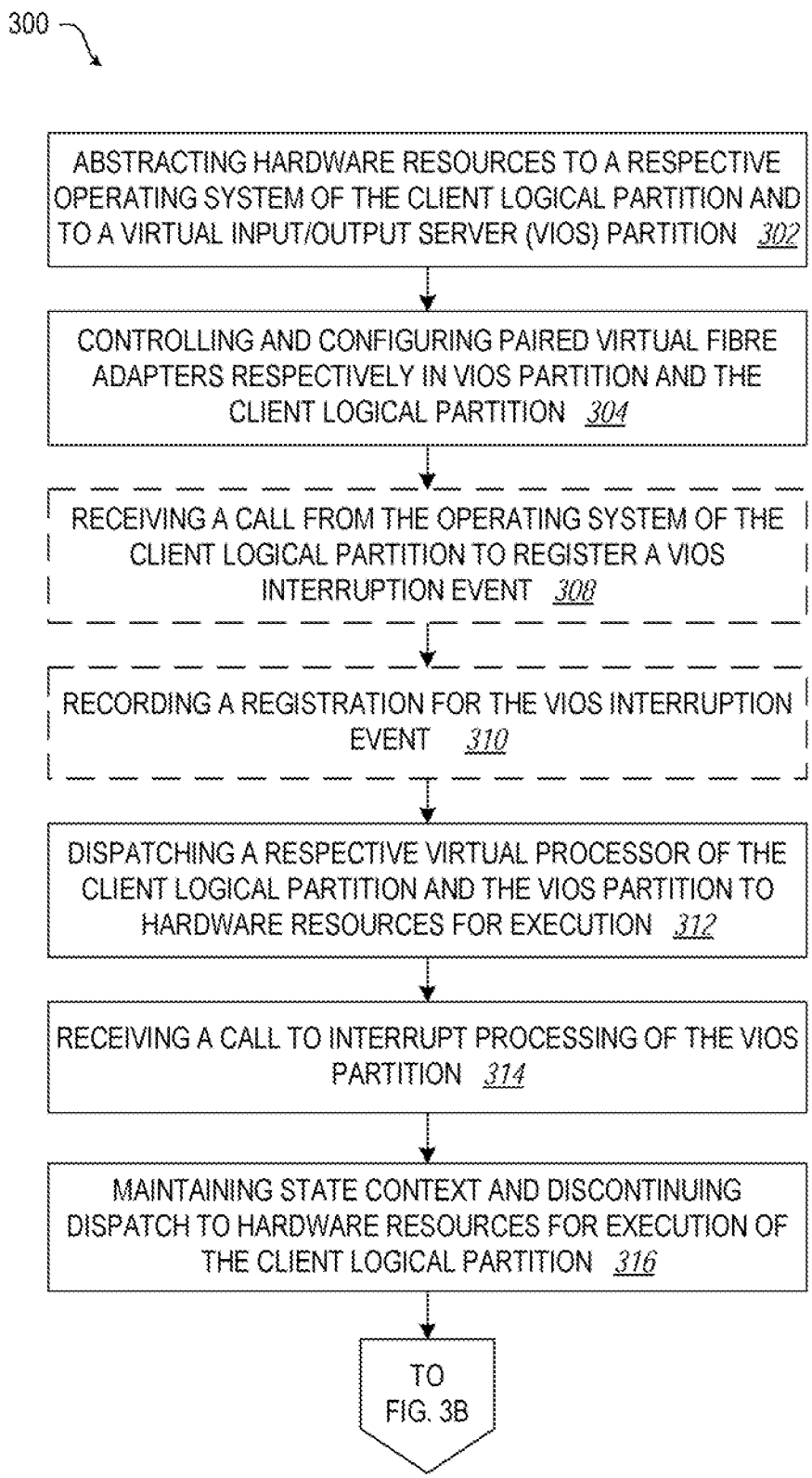
FIGS. 3A-3B provide a flow chart illustrating the processes within the method for managing a system such that client logical partitions are prevented from crashing when a NPIV server goes down according to one embodiment.
Figure 3B:
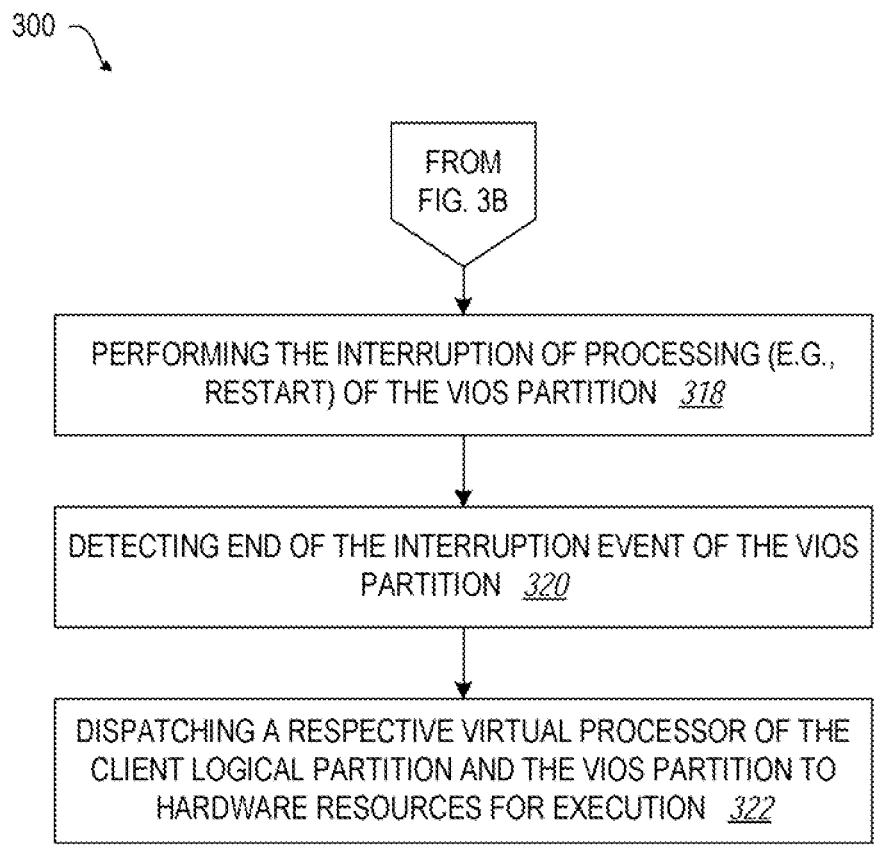

With reference to FIGS. 3A-3B, a methodology 300 is depicted for data processing. A hypervisor firmware utility abstracts hardware resources to a respective operating system of the client logical partition and to a virtual input/output server (VIOS) partition (block 302). The hypervisor firmware utility controls and configures paired virtual fibre adapters respectively in VIOS partition and the client logical partition (block 304). The hypervisor firmware utility receives a call from the operating system of the client logical partition to register a VIOS interruption event (block 308). The hypervisor firmware utility records a registration for the VIOS interruption event (block 310). The hypervisor firmware utility dispatches a respective virtual processor of the client logical partition and the VIOS partition to hardware resources for execution (block 312). The hypervisor firmware utility receives a call to interrupt processing of the VIOS partition (block 314). The hypervisor firmware utility maintains state context and discontinues dispatch of hardware resources for execution of the client logical partition (block 316). The hypervisor firmware utility performs the interruption of processing (e.g., restart) of the VIOS partition (block 318). The hypervisor firmware utility detects an end of the interruption event of the VIOS partition (block 320). The hypervisor firmware utility dispatches a respective virtual processor of the client logical partition and the VIOS partition to hardware resources for execution (block 322).

Figure 4:
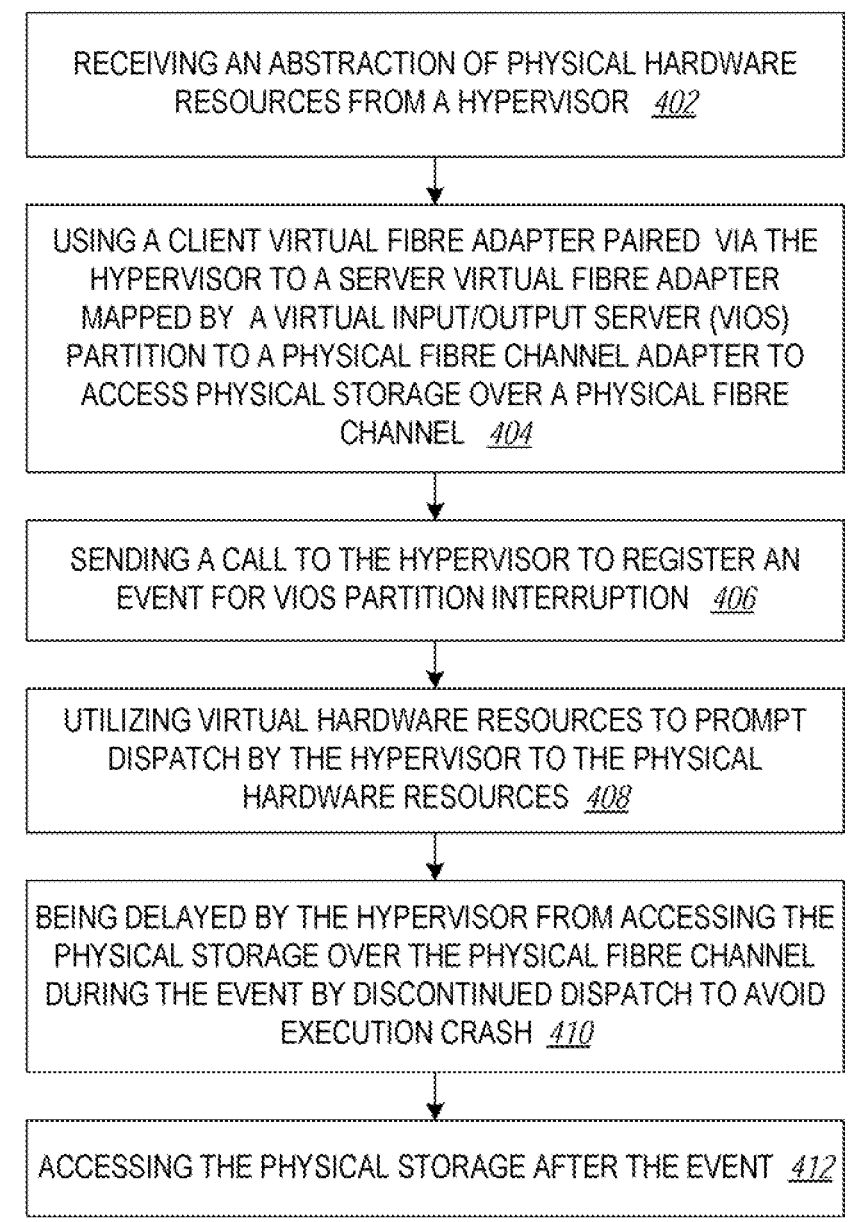
FIG. 4 provides a flow chart illustrating the processes within the method for a client logical partition to register for being prevented from crashing when a NPIV server goes down according to another embodiment.

With reference to FIG. 4, a methodology 400 is depicted for data processing within a virtualization environment comprising a VIOS and client logical partition. A client logical partition receives an abstraction of physical hardware resources from a hypervisor (block 402). A client logical partition uses a client virtual fibre adapter paired via the hypervisor to a server virtual fibre adapter mapped by a virtual input/output server (VIOS) partition to a physical fibre channel adapter to access physical storage over a physical fibre channel (block 404). The client logical partition sends a call to the hypervisor to register an event for VIOS partition interruption (block 406). The client logical partition utilizes virtual hardware resources to prompt dispatch by the hypervisor to the physical hardware resources (block 408). The client logical partition is delayed by the hypervisor from accessing the physical storage over the physical fibre channel during the occurrence of the event by the hypervisor discontinuing to dispatch physical resources to the client logical partition in order to avoid execution crash (block 410). The hypervisor receives notification that the event/condition has ended, and hypervisor enables the client logical partition to access the physical storage after the event (block 412).

Figure 5:
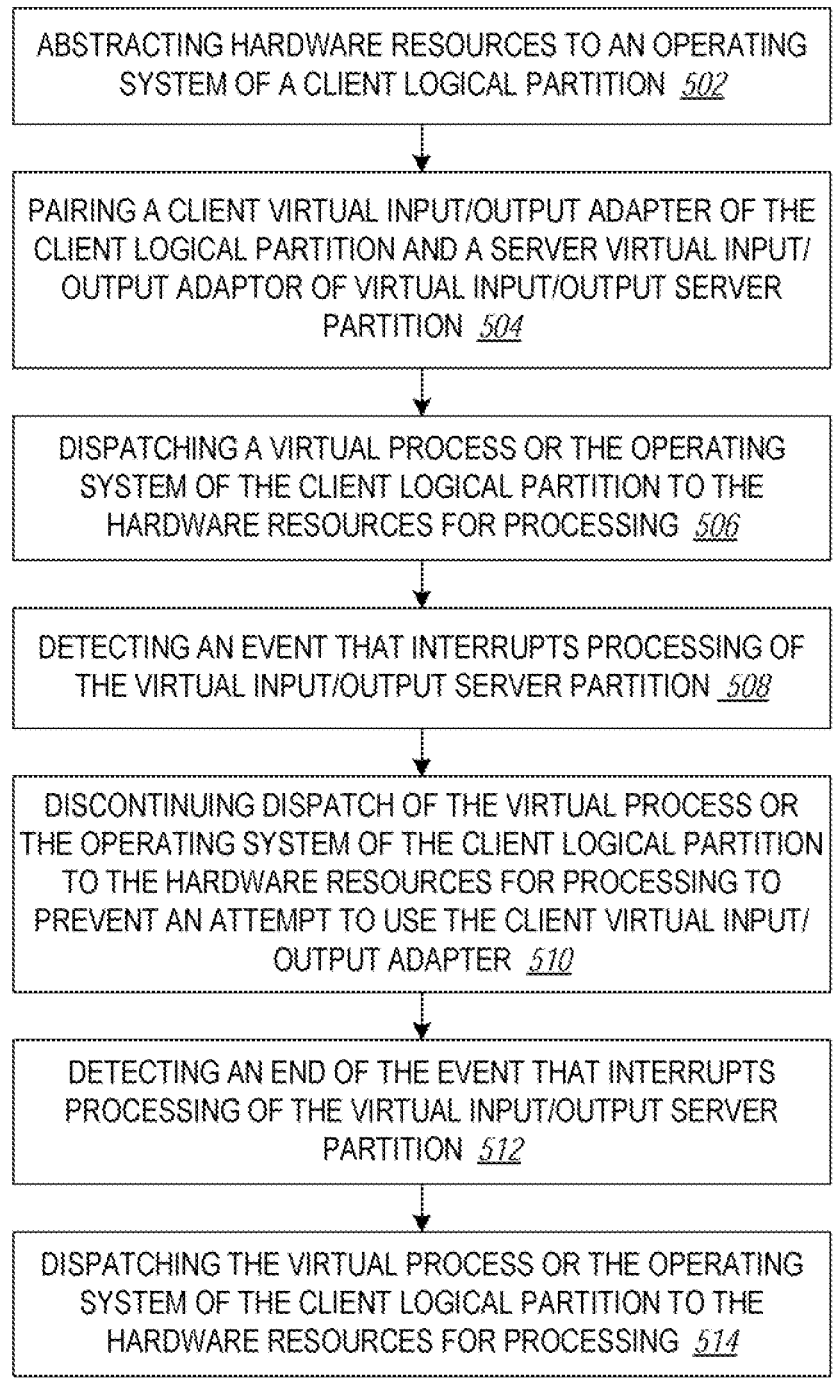
FIG. 5 provides a flow chart illustrating the processes within the method for managing a system such that client logical partitions are prevented from crashing when a virtual input/output server goes down according to an additional embodiment.

With reference to FIG. 5, an alternate methodology 500 is depicted for data processing within a virtualization environment comprising a VIOS and client logical partition. A firmware utility abstracts hardware resources to an operating system of a client logical partition (block 502). The firmware utility pairs a client virtual input/output adapter of the client logical partition and a server virtual input/output adaptor of virtual input/output server partition (block 504). The firmware utility dispatches a virtual process of the operating system of the client logical partition to the hardware resources for processing (block 506). The firmware utility detects an event that interrupts processing of the virtual input/output server partition (block 508). The firmware utility discontinues dispatch of the virtual process of the operating system of the client logical partition to the hardware resources for processing to prevent an attempt to use the client virtual input/output adapter (block 510). The firmware utility detects an end of the event that interrupts processing of the virtual input/output server partition (block 512). In response to detecting the end of the event or condition, the firmware utility dispatches the virtual process of the operating system of the client logical partition to the hardware resources for processing (block 514).

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As described above, with N_Port ID Virtualization (NPIV), a managed system can be configured so that multiple logical partitions (LPARs) can access independent physical storage through the same physical fibre channel adapter. An NPIV client recovery component of a virtualization management component, such as a Power Hypervisor (pHYP), provides the emulation mapping between server and client virtual fibre channel adapters. The pHYP also provides a mechanism that prevents client partition crashes when the NPIV server (e.g., a VIOS logical partition) goes down. When the NPIV server is rebooted or powers down, the pHYP handles the client LPARs to avoid a crash by removing processing resources from the client logical partition. Thereby, an operating system on the client logical partition is prevented from attempting to access a root volume group in physical storage via the NPIV server. The pHYP allocates processor resources to the client LPAR when the NPIV server completes the reboot and/or is powered up and is again available for I/O processing.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A data processing system comprising:
a processor; and
hypervisor firmware executing on the processor and which configures the data processing system to:
abstract hardware resources to an operating system of a client logical partition;
pair a client virtual input/output adapter of the client logical partition and a server virtual input/output adaptor of virtual input/output server partition;
dispatch a virtual process of the operating system of the client logical partition to the hardware resources for processing;
detect an event that interrupts processing of the virtual input/output server partition;
in response to detecting an event that interrupts processing of the virtual I/O server partition, discontinue dispatch of the virtual process of the operating system of the client logical partition to the hardware resources for processing to prevent an attempt to use the client virtual input/output adapter;
detect an end of the event that interrupts processing of the virtual input/output server partition; and
in response to the detecting of the end of the event, dispatch the virtual process of the operating system of the client logical partition to the hardware resources for processing.

2. The data processing system of claim 1, wherein the hypervisor utility further configures the data processing system to receive a call from the operating system of the client logical partition to register for the event, and store a registration to the event associated with an action to discontinue dispatch.

3. The data processing system of claim 1, wherein the hypervisor utility further configures the data processing system to dispatching a virtual input/output process of the virtual input/output server partition that emulates mapping of the server virtual input/output adapter to a physical channel adapter, wherein the physical channel adapter comprises a physical fibre channel adapter that utilizes N_Port ID Virtualization (NPIV) to access a physical storage.

4. The data processing system of claim 1, wherein detecting an event that interrupts processing of the virtual input/output server partition comprises the hypervisor utility configuring the data processing system to detect one or more events from among: failure of the VIOS partition, reboot of the VIOS partition, special exceptions registered by the VIOS partition that prevents access by the client LPAR to the I/O adapters and I/O functionality of the VIOS, power down of the VIOS partition, and reboot of the VIOS partition.

5. The data processing system of claim 1, wherein abstracting hardware resources to the operating system of the client logical partition further comprises the hypervisor utility configuring the data processing system to providing Small Computer System Interface (SCSI) protocols.

6. A computer program product comprising:
a computer usable storage device; and
program code embedded on the computer usable storage device that when executed by a processor of a data processing system performs the following functions:
abstracting hardware resources to an operating system of a client logical partition;
pairing a client virtual input/output adapter of the client logical partition and a server virtual input/output adaptor of virtual input/output server partition;
dispatching a virtual process of the operating system of the client logical partition to the hardware resources for processing;
detecting an event that interrupts processing of the virtual input/output server partition;
in response to detecting an event that interrupts processing of the virtual I/O server partition, discontinuing dispatch of the virtual process of the operating system of the client logical partition to the hardware resources for processing to prevent an attempt to use the client virtual input/output adapter;
detecting an end of the event that interrupts processing of the virtual input/output server partition; and
in response to the detecting of the end of the event, dispatching the virtual process of the operating system of the client logical partition to the hardware resources for processing.

7. The computer program product of claim 6, wherein the program code further provides the functions of receiving a call from the operating system of the client logical partition to register for the event, and storing a registration to the event associated with an action to discontinue dispatch.

8. The computer program product of claim 6, wherein the program code further provides the function of dispatching a virtual input/output process of the virtual input/output server partition that emulates mapping of the server virtual input/output adapter to a physical channel adapter, wherein the physical channel adapter comprises a physical fibre channel adapter that utilizes N_Port ID Virtualization (NPIV) to access a physical storage.

9. The computer program product of claim 6, wherein detecting an event that interrupts processing of the virtual input/output server (VIOS) partition comprises detecting one or more events from among: failure of the VIOS partition, reboot of the VIOS partition, special exceptions registered by the VIOS partition that prevents access by the client LPAR to the I/O adapters and I/O functionality of the VIOS, power down of the VIOS partition, and reboot of the VIOS partition.

10. The computer program product of claim 6, wherein the program code for abstracting hardware resources to the operating system of the client logical partition further comprises code for providing Small Computer System Interface (SCSI) protocols.

* * * * *